US008805785B2

(12) United States Patent
Vasudevan et al.

(10) Patent No.: US 8,805,785 B2
(45) Date of Patent: Aug. 12, 2014

(54) SHARED STORAGE OF CATEGORIZATION, LABELING OR TAGGING OF OBJECTS IN A COLLABORATION SYSTEM

(75) Inventors: Ramesh Vasudevan, Los Altos, CA (US); Percy Mehta, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 277 days.

(21) Appl. No.: 12/500,561

(22) Filed: Jul. 9, 2009

(65) Prior Publication Data
US 2011/0010334 A1 Jan. 13, 2011

(51) Int. Cl.
G06F 7/00 (2006.01)
G06F 17/30 (2006.01)

(52) U.S. Cl.
USPC .......................................... 707/638; 707/625

(58) Field of Classification Search
USPC ................................................ 707/638, 625
See application file for complete search history.

(56) References Cited

U.S. PATENT DOCUMENTS

| | | | |
|---|---|---|---|
| 2004/0133589 A1* | 7/2004 | Kiessig et al. | 707/102 |
| 2007/0124373 A1 | 5/2007 | Chatterjee et al. | |
| 2007/0124374 A1 | 5/2007 | Arun et al. | |
| 2007/0124375 A1 | 5/2007 | Vasudevan et al. | |
| 2008/0162551 A1 | 7/2008 | Geyer et al. | |

OTHER PUBLICATIONS

Entire Prosecution History of U.S. Appl. No. 12/500,550, filed Jul. 9, 2009 by Ramesh Vasudevan et al.
Entire Prosecution History of U.S. Appl. No. 12/500,556, filed Jul. 9, 2009 by Ramesh Vasudevan et al.
Oracle® Collaboration Suite, Concepts Guide, 10g Release 1 (10.1.2), B25491-03, Jul. 2006, pp. 1-106.
Oracle® Mobile Collaboration, Administrator's Guide, 10g Release 1 (10.1.2), B25478-02, Sep. 22, 2006, pp. 1-148.
Margaret Spencer Dixon "Tips for Using Microsoft Outlook to Manage Your "To-Do" Lists", Spencer Consulting, published 2006, pp. 1-3.
Microsoft Office Online, Microsoft Office Outlook, "Assign a color category to a calendar appointment", May 2009, pp. 1-2.
Microsoft Office Online, Microsoft Office Outlook, "Assign a color category to an email message", May 2009, pp. 1-3.
Microsoft Office Online, Microsoft Office Outlook, "Create a new color category", May 2009, pp. 1-2.
"Organizing Information with Outlook 2007 Categories" excerpted from "Outlook 2007 for Dummies", Feb. 21, 2008, pp. 1-3.

(Continued)

*Primary Examiner* — Apu Mofiz
*Assistant Examiner* — Jared Bibbee
(74) *Attorney, Agent, or Firm* — Omkar K. Suryadevara; Silicon Valley Patent Group LLP

(57) ABSTRACT

A computer that is programmed with collaboration software receives a new value of an attribute (or property or characteristic) which is specific to a label (or tag or category) as applied to an object managed by the computer. The computer does not use the new value to overwrite a corresponding old value in existing metadata. Instead, the computer is programmed to hold the new value in an incremental label application for the object. The computer is further programmed to respond to a request for the object's label application, by retrieving the incremental label application, and a full application of said label to said object. The computer uses attribute values in the incremental label application to update corresponding attribute values in a copy of the full label application, in a time sequence based on the time of creation of incremental label applications, thereby to generate a current label application.

20 Claims, 7 Drawing Sheets

(56) References Cited

OTHER PUBLICATIONS

Using Outlook Calendar, believed to be prior to May 31, 2009, pp. 1-32.
Outlook Wise Tips & Tricks, Updating Outlook Categories for Multiple Items, believed to be Jun. 4, 2007, pp. 1-5.
Microsoft Outlook 2003: Sharing your calendar using Microsoft Exchange Server, Mar. 2009, pp. 1-4.
Microsoft Outlook 2003: Opening another user's shared calendar using Microsoft Exchange Server, Oct. 2008, pp. 1.
Office Action dated Oct. 13, 2011 in U.S. Appl. No. 12/500,550, pp. 9.
Amendment dated Jan. 13, 2012 in U.S. Appl. No. 12/500,550, pp. 14.
Final Office Action dated Jan. 31, 2012 in U.S. Appl. No. 12/500,550, pp. 13.
Office Action dated Sep. 27, 2011 in U.S. Appl. No. 12/500,556, pp. 13.
Amendment dated Jan. 26, 2012 in U.S. Appl. No. 12/500,556, pp. 18.
Fabrega, F.J.T. et al. "Copy on Write", Nov. 1, 1995, pp. 29.
"Oracle®Beehive Concepts Release 1 (1.4)", part No. E13794-02, published Dec. 2008, pp. 114.
"The Beehive 1.4 Application Developers Guide", part No. E13800-01, published Sep. 2008, pp. 146.
Amendment dated Jul. 3, 2013 in U.S. Appl. No. 12/500,556.
Interview Summary dated Jul. 25, 2013 in U.S. Appl. No. 12/500,556.
Advisory Action dated Jul. 29, 2013 in U.S. Appl. No. 12/500,556.
Amendment dated Aug. 9, 2013 in U.S. Appl. No. 12/500,556.
Interview Summary dated Aug. 12, 2013 in U.S. Appl. No. 12/500,556.
Notice of Allowance dated Oct. 4, 2013 in U.S. Appl. No. 12/500,556.
Amendment dated Dec. 16, 2012 in U.S. Appl. No. 12/500,556.
Final Office Action dated Mar. 11, 2013 in U.S. Appl. No. 12/500,556.
U.S. Appl. No. 12/500,550, pp. 41.
Applicant's Interview Summary dated May 30, 2012 in U.S. Appl. No. 12/500,550, pp. 3.
Amendment dated May 31, 2012 in U.S. Appl. No. 12/500,550, pp. 9.
U.S. Appl. No. 12/500,556, pp. 39.
Amendment dated Feb. 16, 2014 in U.S. Appl. No. 12/500,550, pp. 10.
Notice of Allowance dated Feb. 18, 2014 in U.S. Appl. No. 12/500,556, pp. 7.

* cited by examiner

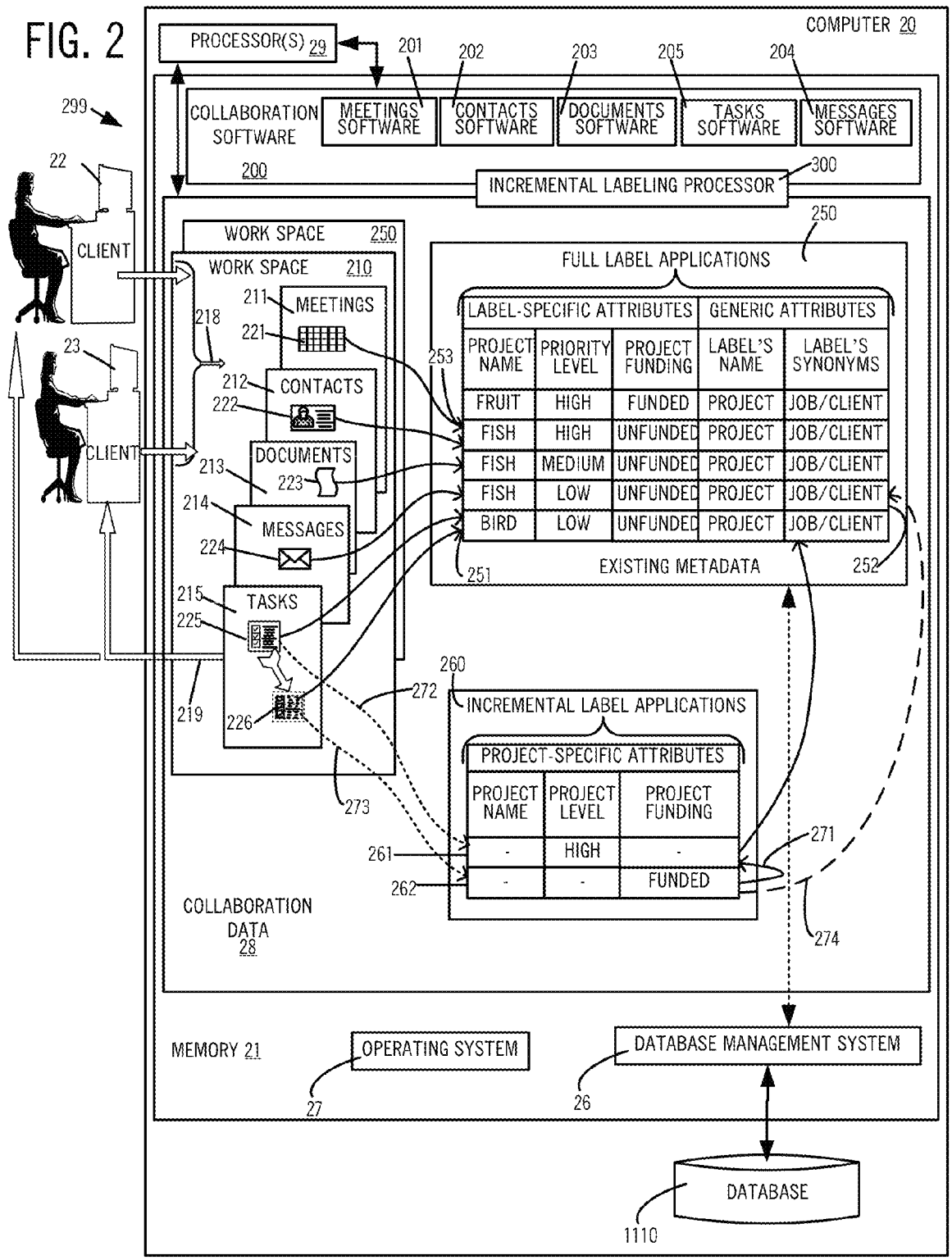

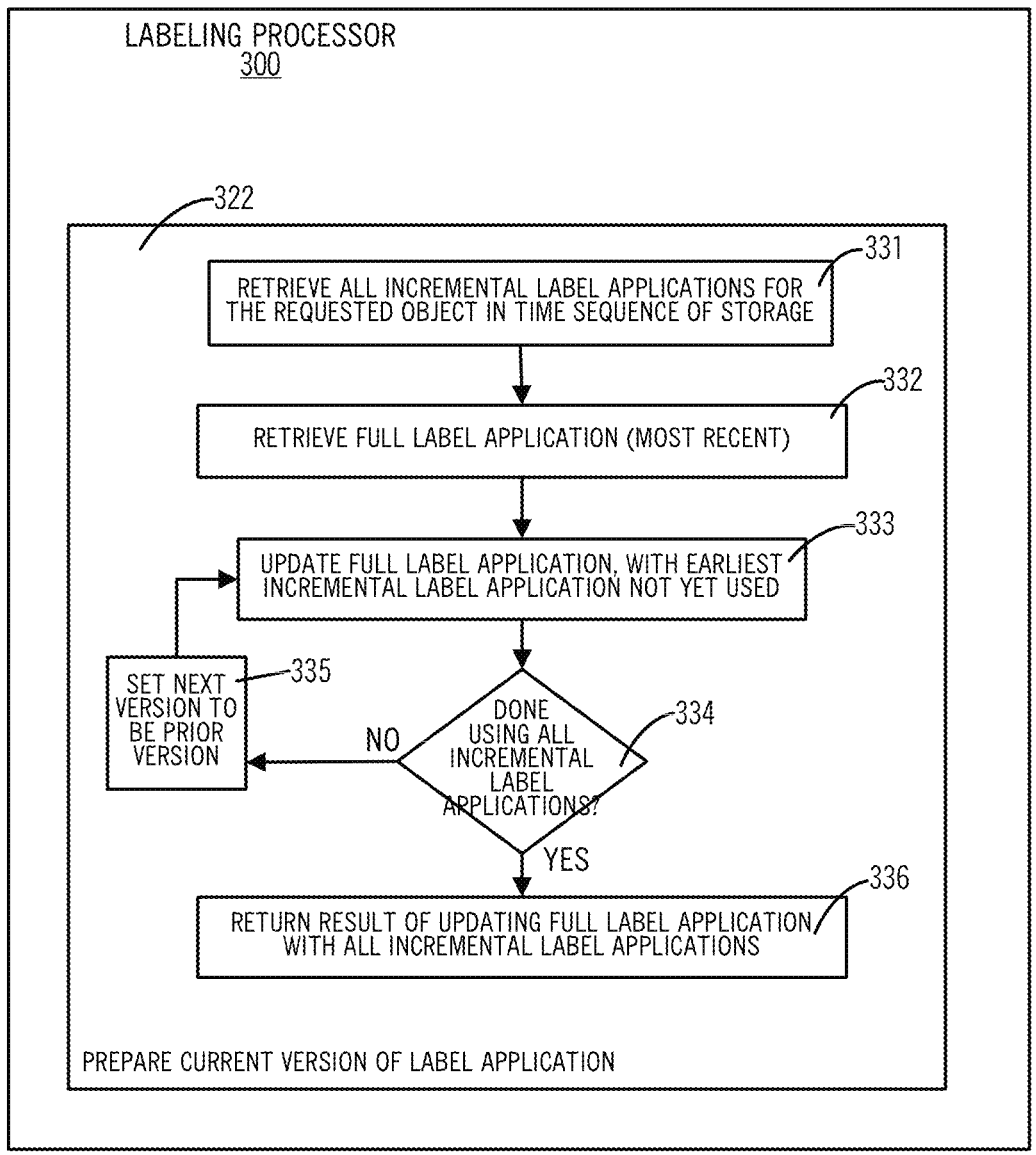

SHARED STORAGE OF CATEGORIZATION, LABELING OR TAGGING OF OBJECTS IN A COLLABORATION SYSTEM

CROSS-REFERENCE TO RELATED PATENT APPLICATIONS

This patent application is related to and incorporates by reference herein in their entirety the following two patent applications that are jointly owned and concurrently filed herewith:

(1) U.S. application Ser. No. 12/500,550, entitled "REPRESENTING AN OBJECT AS AN AGGREGATE OF IDENTIFIABLE PARTS SHAREABLE BY USERS OF A COLLABORATION SYSTEM" by Ramesh Vasudevan et al. and (2) U.S. application Ser. No. 12/500,556, entitled "REPRESENTING ATTACHMENTS OF OBJECTS IN A COLLABORATION SYSTEM USING METADATA COPIES" by Ramesh Vasudevan et al.

BACKGROUND

Use of categories is well known in prior art computer systems, for managing items (also called objects) of data. For example, see the article entitled "Tips for Using Microsoft Outlook To Manage Your 'To-Do' Lists" by Margaret Spencer Dixon, Esq. President, Spencer Consulting, published 2006 that is incorporated by reference herein in its entirety as background. For example, a user may categorize certain tasks as belonging to Project Fish and other tasks as belonging to Project Bird.

A more recent version, namely Office Outlook 2007 software (hereinafter "OUTLOOK") available from MICROSOFT CORPORATION has a "Categorize" menu which displays six default categories that are color coded, and by default named Blue Category, Green Category etc. A user may right click on any item in OUTLOOK, such as an email message, a contact, a task or an appointment in the calendar, and select one of the categories in a predetermined list, e.g. 15 colors provided by default in OUTLOOK thereby to categorize the item. Hence, a user may categorize certain items which are urgent in the Red Category and categorize other items that are of the lowest priority in the Green Category.

Note that OUTLOOK does not appear to use a registry for the list of categories, and instead the categories seem to be stored in each user's own individual mailbox or pst file, which make them inaccessible to other users even if the other users are in the same organization. Hence, if a first user assigns a color category (e.g. Red Category) to an item and then emails that item to a second user, the second user does not appear to receive with the item, the color category (i.e. the same Red Category) assigned by the first user. Such users may share documents with one another, e.g. files may be shared, via a server of the prior art. Objects other than files, such as contacts and/or calendar appointments may be shared via a collaboration environment.

A collaboration environment 100 of the prior art (FIG. 1) typically includes a server 110 ("collaboration server"), and multiple users of clients 120-1 . . . 120-N (120 generally) interconnected via a network 112 such as the Internet, VPN, LAN, WAN or other packet switched interconnection medium. Collaboration server 110 includes a workspace 150 for providing collaborative access to a plurality of applications 130-1 . . . 130-3 (130 generally). Applications 130 provide services to the users of clients 120 via workspace 150 and network 112. Each of the applications 130 has respective storage areas 132-1 . . . 132-3 (132 generally) for storing application data 134, therefore relieving workspace 150 from storing application data 134 on behalf of users. Examples of shared application data 134 include various shared objects, for example, calendar appointments, tasks, contacts etc.

Workspace 150 of FIG. 1 includes metadata defining the application data 134 stored by applications 130 on behalf of each user of a client 120. Workspace 150 includes properties 160 that define how users of clients 120 interact with the applications 130. Properties 160 define aspects such as privileges, policies, other users and available applications 130 (services) corresponding to a particular workspace 150. Server 110 is operable by users to assign categories to shared objects in a workspace, such as contacts, files, appointments. A user may create a category and assign an item to it in one client, and server 110 shows the assigned category consistently to other users regardless of the client used to access server 110. For example, see Oracle Collaboration Suite 10g Contacts from ORACLE CORPORATION.

Nonetheless, the inventors of the current patent application believe that in prior art systems of the type shown in FIG. 1, a change in categorization of an item, is typically made by overwriting that item's old category with a new category. For example, if priority is lowered on a task previously assigned to a Red Category (for high priority tasks), then overwriting the old category with the new category requires less storage than storing the task's new category (e.g. Green Category) in addition to the old category. Improvements of the type discussed below are believed to be needed in situations that require both categories to be stored.

SUMMARY

One or more computers are programmed in accordance with the invention to implement a particular machine which executes software to store a label or tag or category or annotation (collectively referred to below as "labels") in a shared manner for objects of multiple types and/or multiple versions rather than individual storage of each label's application within each object. In accordance with the invention, a user may apply a label to one or more object(s) in the computer(s) in the normal manner, and also use the applied label in the normal manner. Hence, programmed computer(s) in accordance with the invention operate transparently to users, in order to implement efficient storage and retrieval of each label's application to objects of different types and/or versions.

In some embodiments, a computer that is programmed with collaboration software receives a new value of an attribute or property or characteristic (collectively referred to below as "attribute") which is specific to a label as applied to an object managed by the computer. The computer does not use the new value to overwrite a corresponding old value in metadata for the object existing in (or accessible to) the computer. Instead, the computer is programmed to hold the new value in memory (and store to disk), as an incremental label application.

In several such embodiments, the computer is further programmed to respond to a request for an object's label application, by retrieving one or more incremental label application(s), as well as a full application of said label to said object. The computer uses attribute values in the incremental label application to update corresponding attribute values in a copy of the full label application, in a time sequence based on the time of creation of incremental label applications, thereby to generate a current label application.

Some embodiments of the above-described computer(s) is/are programmed to maintain a common repository of label applications, identified by unique identifiers. Various types of object(s) to which the label(s) are applied identify their individual label applications using the unique identifiers. The common repository holds only one copy of each unique label application. The just-described use of unique identifiers for label applications to multiple objects (of multiple types and/or multiple versions) reduces memory consumption relative to redundantly storing the same label application multiple times for each type of and/or each version of an object in a collaboration system.

BRIEF DESCRIPTION OF THE FIGURES

FIG. 2 illustrates, in a block diagram, a server computer 20 in accordance with the invention that incrementally represents an object's label as a combination of a materialized label and one or more unmaterialized labels.

FIG. 3B illustrates, in a flow chart, a sequence of acts performed by some embodiments of the method of FIG. 3A to implement an operation 322.

DETAILED DESCRIPTION

Figure 1:
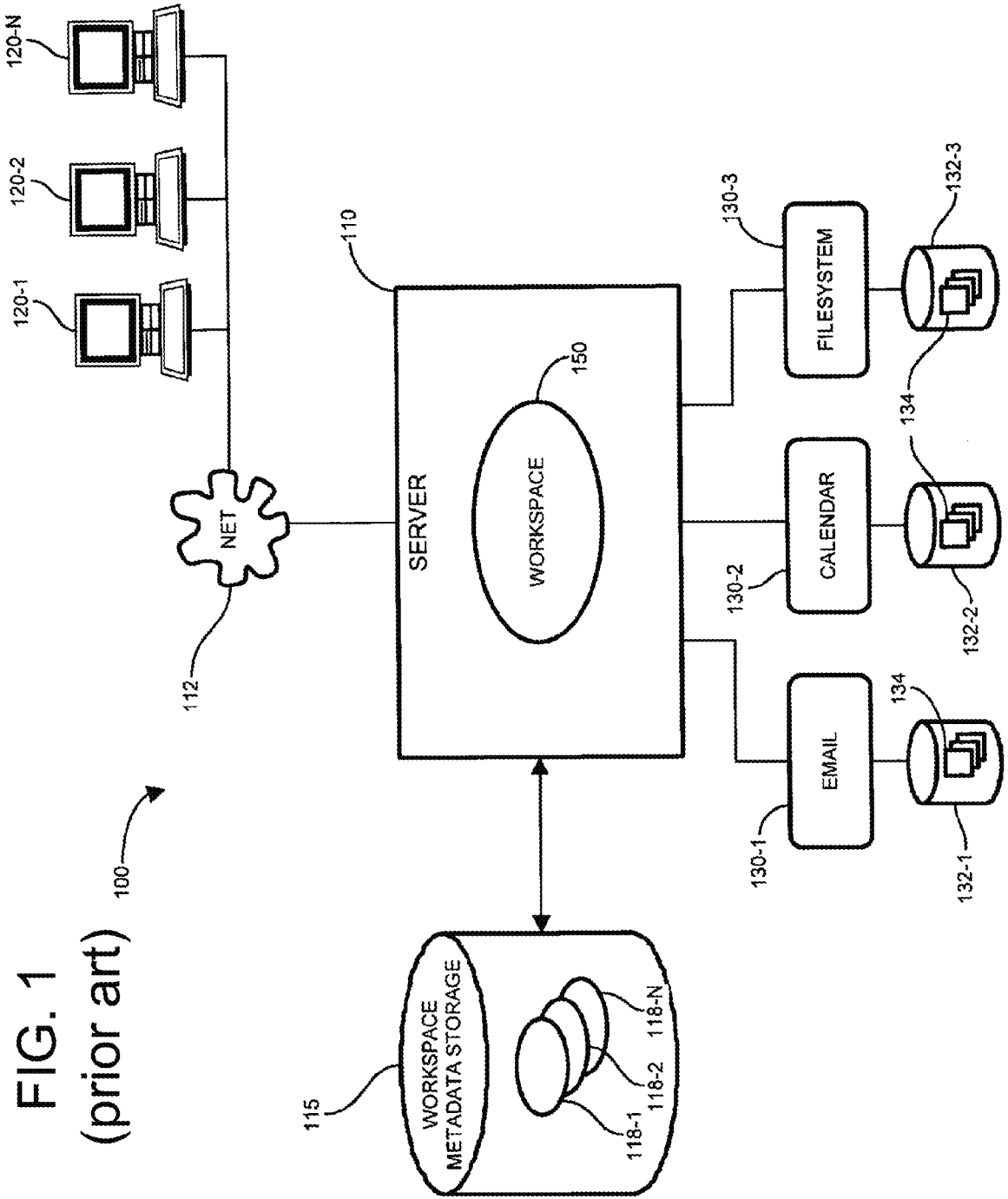
FIG. 1 illustrates, in a block diagram, one example of a collaboration system of the prior art.

Referring to FIG. 2, a computer 20 ("server") is specifically programmed, in some embodiments of the invention, to implement a particular machine which executes collaboration software 200 stored in memory 21 to represent a label incrementally over time as the label is changed, namely as a combination of a full label application 251 and one or more incremental label applications 261, 262. In the example illustrated in FIG. 2, a full label application 251 identifies the value "BIRD" for the attribute "project name", the value "LOW" for the attribute "priority level" and the value 'UNFUNDED" for the attribute "project funding." Note that the just-described three attributes are specific to a label having the name "PROJECT", shown applied to a collaboration object 225 of type task. Similarly, another full label application 252 is shown in FIG. 2 applied to an object 224 of type message, identifying the message as belonging to the FISH project, at a LOW priority level, also an UNFUNDED project.

In the example illustrated in FIG. 2, if the priority level changes from LOW to HIGH for the task type object 225, computer 20 does not respond to this change by overwriting the value "LOW," and instead creates an incremental label application 261 that is stored in memory and associated with full label application 251. Next if the project funding changes from UNFUNDED to FUNDED for the task type object 225, computer 20 again does not respond to this change by overwriting the value "UNFUNDED," and instead creates another incremental label application 262 that is stored in memory in association with incremental label application 261 as shown by arrow 271. Accordingly, task type object 225 is now associated with incremental label application 261 as shown by a dashed arrow 272 in FIG. 2 while incremental label application 261 is itself associated with incremental label application 262 as shown by arrow 271.

In response to a command to supply the current application of the label "Project" to the task type object 225, computer 20 retrieves the three label applications associated therewith, namely full label application 251, and two incremental label applications 261 and 262. Values in these two incremental label applications 261 and 262 are used to update corresponding values in a copy of full label application 251. The just-described updates are performed in a specific time sequence that is based on the sequence of creation of incremental label applications 261 and 262. After both these label applications have been used, the result is a current version of the full label application, which is returned as a response to the command. In this example, the current version of the project label identifies the task type object 225 as being associated with the Bird project, at a high priority, and funded.

If the content in task type object 225 is changed, e.g. if the schedule is changed or a description is changed, then a new version 226 is created by execution of task software 205 in computer 20. Note that neither of label applications 250 and 260 are replicated when new version 226 is created. Instead, new version 226 is simply associated with incremental label application 262 as shown by a dashed arrow 273 in FIG. 2. Accordingly, eliminating the replication of any label application when an object is versioned results in memory savings, relative to prior art methods in which label applications are individually stored for each version of an object. Additionally, in the embodiment illustrated in FIG. 2, a full label application 253 is associated with multiple objects that are of different types, such as contact type object 222 and meeting type object 221. Hence, additional replication of a given label application for different types of objects is also eliminated in some embodiments in accordance with the invention, thereby to provide further memory savings relative to prior art methods in which label applications are individually stored for each type of object.

Returning to the example shown in FIG. 2, if the FISH project becomes funded, then in some embodiments, incremental label application 262 may be associated with each of the three full label applications for the FISH project, such as the association of incremental label application 262 with full label application 252 as shown by dashed arrow 274. Hence, a one-to-many relationship arises in re-using the same incremental label application 262 with multiple full label applications (associated with objects 225, 226 and 224 in the above-described example). Incremental representation of an attribute of a label as applied to a collaboration object has a drawback which makes collaboration software 200 slower to execute, because run-time access to an label's attribute by a client computer 22, 23 requires extra acts to be performed, by server computer 20 to construct a current version of a full label application.

Depending on the embodiment, computer 20 includes one or more processor(s) 29 and a memory 21 (FIG. 2). Processors 29 are dual core processors in CENTRINO DUO® available from Intel Corporation in some embodiments. Note that multiple processors are not a critical aspect of some embodiments, and alternative embodiments are implemented with a single processor 29 in computer 20 that is time-shared by multiple processes (of a collaboration system 299) in the normal manner. Collaboration system 299 is formed by computer 20 executing collaboration software 200 while using collaboration data 28. As will be readily apparent to the skilled artisan, one or more portions of collaboration software 200 and/or collaboration data 28 may be respectively executed by and/or stored in multiple computers that together form a collaboration system in a distributed processing environment.

Memory 21 (FIG. 2) of several embodiments ("first embodiments") includes, in addition to collaboration software 200 and independent therefrom, one or more portions of other software, such as database management software 26 and/or operating system software 27. Specifically, collaboration software 200 of several first embodiments uses one or more services normally provided by database management software 26 and/or operating system software 27. However, collaboration software 200 of certain first embodiments is implemented independent of database management software 26 and/or operating system software 27, depending on the embodiment.

Alternative embodiments of the invention extend other conventional software, e.g. extend database management (DBMS) software and/or operating system (OS) software by integrating therein one or more aspects of collaboration software 200. Hence, OS software 27 (FIG. 2) is itself extended in some alternative embodiments ("second embodiments") by implementing therein ("natively") one or more methods and/or data structures described herein, to support versioning of objects that are shared by multiple users. As another example, DBMS software 26 (FIG. 2) is extended in certain alternative embodiments ("third embodiments") by implementing therein one or more methods and/or data structures described below to support versioning of shared objects. Other embodiments extend both softwares 26 and 27 to implement methods and/or data structures of the type described herein.

In many embodiments of the invention, as illustrated in FIG. 2, collaboration software 200 in memory 21 includes, for example, a meetings software 201, a contacts software 202, a documents software 203, a discussions software 204 and a messages software 205. The just-described software 201-205 need not be included as portions of collaboration software 200, e.g. if these software are supported natively by other software, such as database management software 26 and/or operating system software 27. Memory 21 also holds data 28 used by collaboration software 200 of several first embodiments, although as noted above such data 28 may be natively used by other software, such as such as database management software 26 and/or operating system software 27 in the second and third embodiments described above.

In some embodiments, data 28 defines one or more workspaces, such as workspaces 210 and 250, through which multiple users share all information related to the objects. For example, a workspace 210 is illustrated in FIG. 2 as receiving information via an input link 218 from client computers 22 and 23 that are connected to computer 20 via a network, such as the Internet. Computer 20 transmits information about one or more objects in workspace 210 to be displayed to the users of client computers 22 and 23 via an output link 219. The objects that are accessible through a workspace can be of any type, selected from among a number of predetermined types supported by collaboration software 200, such as a message type, a document type, a contact type, a discussion type, and a meeting type.

Unless otherwise described explicitly herein, workspaces 210 and 250 are implemented in a manner similar or identical to workspaces described in, for example, the following documents each of which is incorporated by reference herein in its entirety: United States Patent Application Publication 20070124373 by Ramkrishna Chatterjee et al. published May 31, 2007 and entitled "Methods and apparatus for defining a collaborative workspace"; United States Patent Application Publication 20070124374, by Arun Gopalan et al. published May 31, 2007, entitled "Methods and apparatus providing collaborative access to applications."

Referring to FIG. 2, workspace 210 includes several containers 211-215 through which objects in a server computer 20 are accessible to clients. For example, information related to an object 223 is accessible to users of client computers 22 and 23 in a container 213 in workspace 210 in server computer 20. In this example, object 223 is of type document, container 213 is also of type document, and a corresponding application, namely documents software 203, is used by computer 20 to interface with software in computers 22 and 23 (e.g. word processing software, such as MICROSOFT WORD available from Microsoft Corporation). As another example, another container 214 in workspace 210 holds another object 224 of type message, and a messages software 204 is used by computer 20 to interface with software in client computers 22 and 23 (e.g. email client software, such as MICROSOFT OUTLOOK available from Microsoft Corporation).

In some embodiments, applications 201-205, which are portions of collaboration software 200, are implemented in a manner similar or identical to software called "Oracle Beehive" as described in, for example, a paper entitled "Oracle® Beehive Concepts Release 1 (1.4)", part number E13794-02, published December 2008 and available from Oracle Corporation of Redwood Shores, Calif. The just-described paper is incorporated by reference herein in its entirety.

Figure 3A:
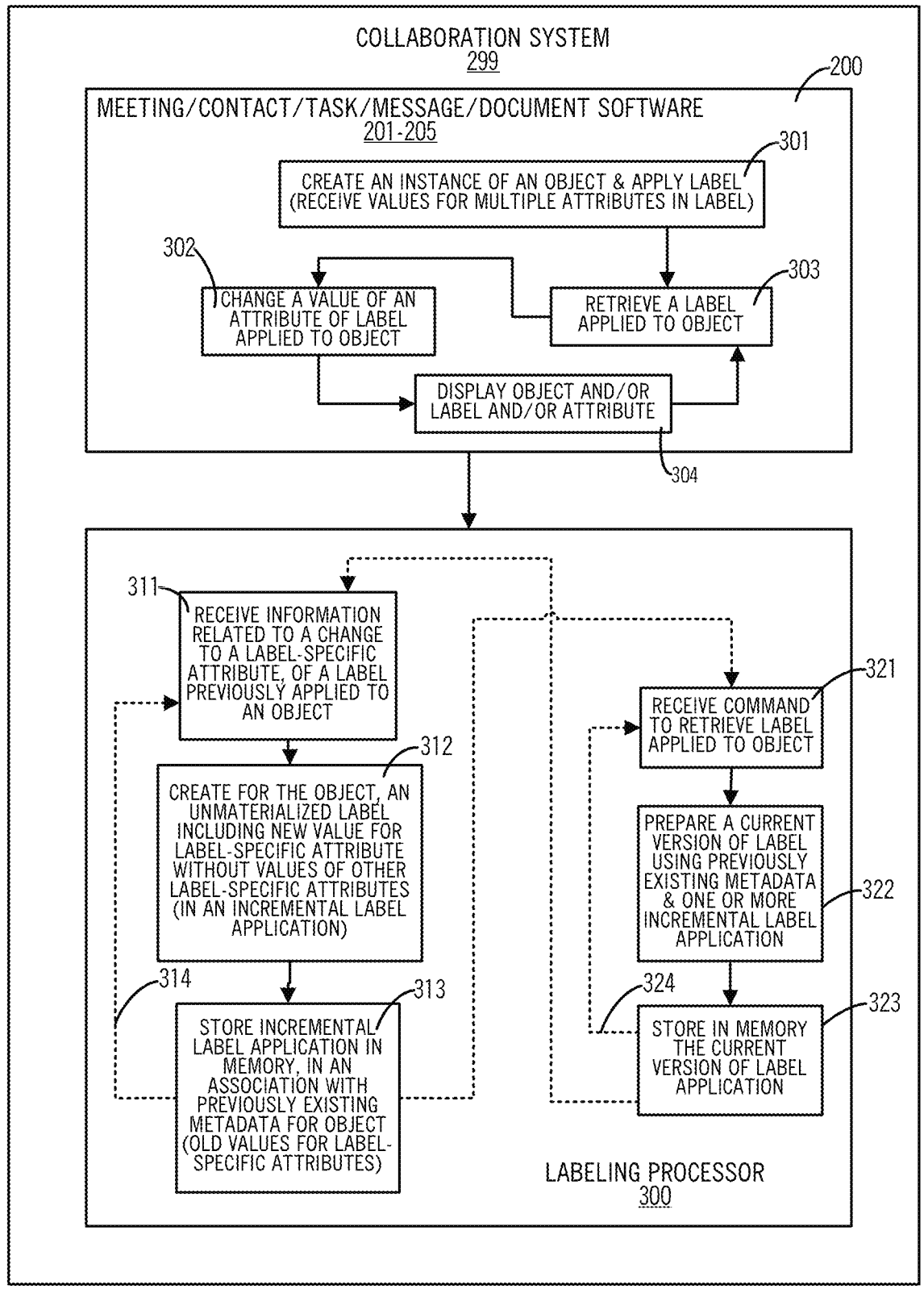
FIG. 3A illustrates, in a flow chart, a method performed by an incremental labeling processor that is included in a collaboration system of several embodiments of the invention.

One or more computers 20 are programmed as illustrated in FIG. 3A to execute collaboration software 200 to create an object and apply a label to it in the normal manner as illustrated by act 301. Thereafter, computer 20 may retrieve a label's application to an object in act 303 in the normal manner, followed by changing a value of an attribute of the label application in act 302 also in the normal manner. Additionally, computer 20 may display an object and/or its label and/or the label's attribute as per act 304 also in the normal manner. Hence applications 201-205 may apply and use a label to any object in the normal manner. However, computer 20 includes a labeling processor 300 which performs a set of acts 311-313 to store a label application and another set of acts 321-323 to retrieve a label application as discussed below.

Specifically, in some embodiments, labeling processor 300 receives information related to a change to a label-specific attribute, of a label that was previously applied to an object as per act 311. Thereafter, in act 312, labeling processor 300 creates for the object an incremental label application (also called unmaterialized label) which includes a new value for the label-specific attribute but does not include any existing values of other label-specific attributes for the label. Next, in act 313, labeling processor 300 stores the incremental label application in its memory and/or in a database 1110 on a hard disk accessed via a database management system 26 (FIG. 2). Thereafter, as per branch 314, labeling processor 300 may return to act 311, to process any additional changes in label application that may be received.

Labeling processor 300 in computer 20 is further programmed to receive a command to retrieve a label as applied to an object as per act 321. In response, labeling processor 300 performs act 322 to prepare a current version of the label application, using existing metadata which including a prior version of a full label application (e.g. illustrated as item 251 in FIG. 2) and one or more incremental label application(s) (e.g. illustrated as items 261, 262 in FIG. 2). Thereafter, in act 323, labeling processor 300 stores the current version of the label application in memory for use by computer 20 in executing software 201-205 (as discussed above).

In some embodiments, labeling processor 300 performs acts 331-336 illustrated in FIG. 3B to implement operation 322 discussed above. Specifically, in act 331, labeling processor 300 retrieves all incremental labeling applications for a requested object, in a time sequence of storage. Next, in act 332, labeling processor 300 retrieves the full label application, the most recent version stored. Next, in act 333, labeling processor 300 updates a copy of the full label application with values of attributes from the earliest incremental label application that has not yet been used. Thereafter, in act 334, labeling processor 300 checks if all incremental label applications have been used to update the copy of the full label application. If not, then labeling processor 300 goes to act 335 to increment to the next version and then repeats act 333. Eventually, when all incremental label applications have been used in the update, the yes branch is taken from act 334 and labeling processor 300 performs act 336 to return the result of updating.

Figure 4A:
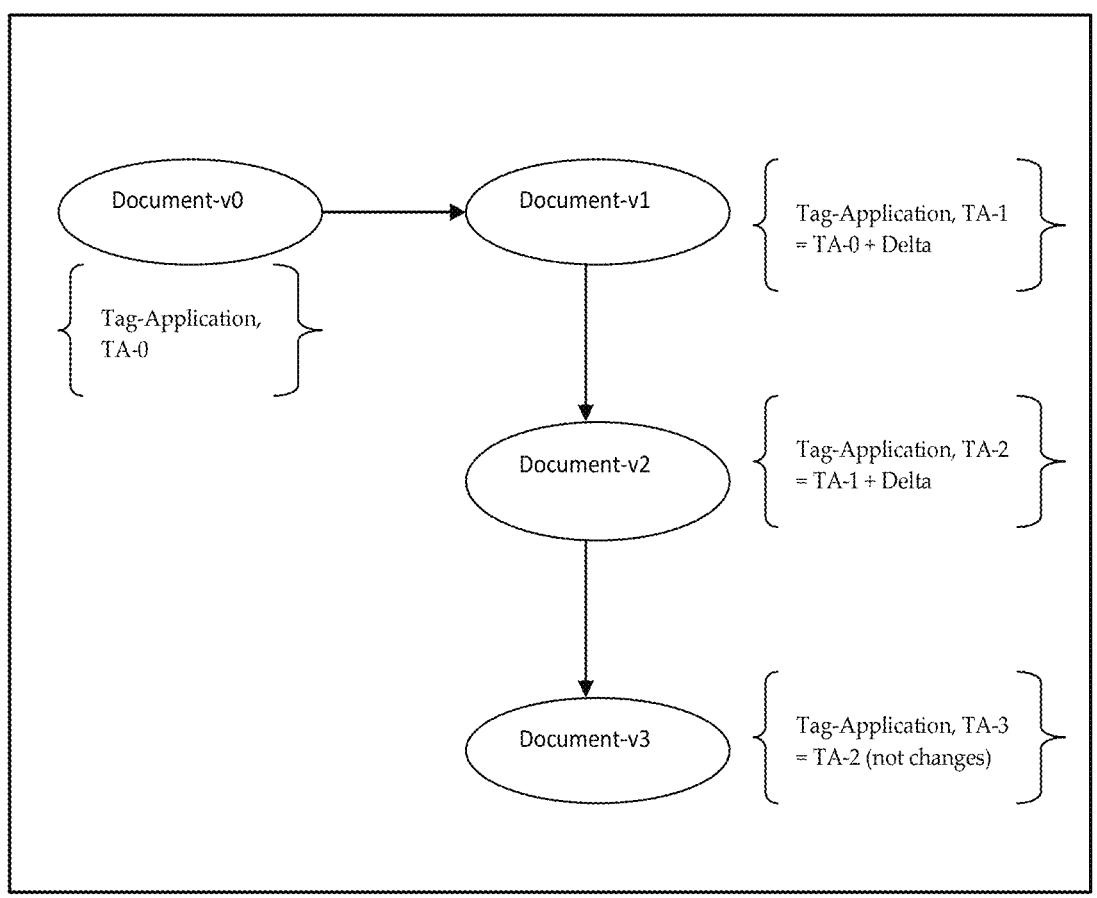
FIG. 4A illustrates, in a block diagram, an example of incremental changes in a label applied to a document as the document changes over time.

FIG. 4A is an illustration of the method used in some embodiments of the invention wherein a document is versioned over time with varying label applications (hereinafter called tag applications). Specifically, FIG. 4A illustrates use of a tag T with attributes a1, a2 and a3. An initial version of a document is created say Document-v0. Tag T is now applied to this document with values collected for attributes a1, a2 and a3. This is referred to as Tag-Application TA-0 as shown in FIG. 4A. Now assume that a new version of the same document is uploaded, say Document-v1 to which tag T is again applied but with a different set of attribute values, which we refer to as Tag-application TA-1. TA-1 however is now captured as TA-0+ any changes that make TA-1 differ from TA-0 (delta) thus preventing duplication of the entire Tag-Application. Similarly for document version Document-v3 we apply the tag T with the same set of attribute values used for its previous version Document-v2. In this case we do not capture Tag-Application TA-3 again but simply make it reference Tag-Application TA-2.

Some embodiments maintain referential Integrity of Tag-Applications as follows. As Tag-Applications on shared/versioned artifacts may themselves change and/or the artifacts themselves maybe deleted maintaining the referential integrity of Tag-Applications is critical. Some embodiments achieve this in the following two ways. Firstly, if a Tag-Application for a given artifact is modified, we check to see if there are any dependent Tag-Applications. If so, the original Tag-Application is retained and the new Tag-Application is captured as before as combination of the Tag-Application for the previous version and any deltas. Secondly, if an artifact with a Tag-Application is deleted, the Tag-Application is only destroyed in the event that there are no dependent Tag-Applications.

Whenever the Tag metadata for a specific artifact has to be retrieved we walk up the version hierarchy computing the effective Tag-Application. This exercise is also undertaken in cases where a Tag based search is to be performed with specific values assigned to certain attributes. Using the sample diagram in FIG. 4A as an example, to retrieve Tag-Application TA-2 some embodiment walk up the version tree collecting Tag-Applications TA-1 and TA-0 taking into consideration the delta applicable at each level.

Hence some embodiments efficiently capture Tag-Applications by avoiding duplication of data by not recapturing entire Tag-Applications when there is an existing application with similar data. While this approach has the distinct advantage of providing better storage utilization it introduces an overhead of computing effective Tag-Applications by walking up version hierarchies as described above. When a Tag-Application is persisted in its entirety it is referred to as a Materialized Tag-Application. Tag-Applications that reference other Tag-Applications and require construction are referred to as Un-materialized Tag-Applications. In order to strike an effective balance between efficient storage and computational overhead we heuristically determine when to store a Tag-Application as a Materialized Tag-Application versus an Un-materialized Tag-Application depending on the data to be copied.

Figure 4B:
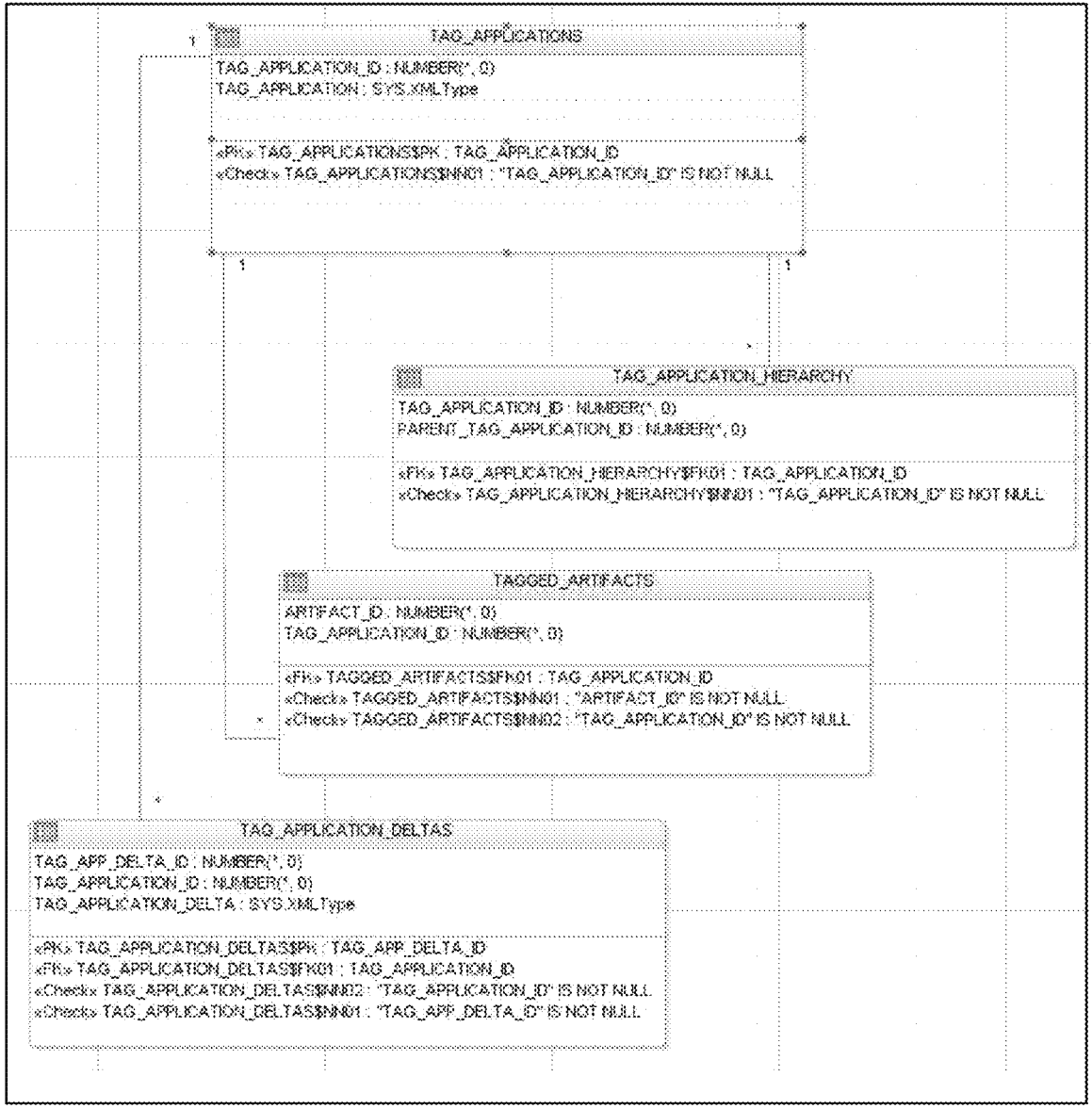
FIG. 4B illustrates, in an entity-relationship diagram, tables in a database of some embodiments of the invention.

Some embodiments support storage of both Materialized as well as Un-materialized Tag-Applications and provide the ability to dynamically switch from one to the other depending on the number of Tag-Applications being persisted. To further illustrate our solution we provide the following pseudo implementation using the Oracle database as illustrated in FIG. 4B. Specifically, the following database tables are used in this illustrative implementation:

Tag_Applications table: Tracks the Tag-Applications.

Tagged_Artifacts table: Tracks the Artifact to Tag-Application association

Tag_Application_Hierarchy table: Tracks the Tag-Application hierarchy

Tag_Application_Deltas table: Tracks the deltas computed for each Tag-Application with respect to its predecessor.

Let us now walk through a working sample using Tag-Application diagram in the previous section and the above schema.

Consider a tag T with attributes a1, a2 and a3 is created.

Now let us take the first version of some document say Document-v0 and apply T to it capturing values for attributes a1, a2 and a3. This Tag-Application is stored in the Tag-Applications table as a Materialized Tag-Application and is identified by ID, TA0. Entries are also created in the Tagged_Artifacts table to associate Tag-Application, TA0 to Document-v0 and in the Tag_Application_Hierarchy table with TA0 and its parent set to NULL.

A new version of the document, Document-v1 is created and tag T is applied to it this time with a different set of attribute values for say a1 and a2. This Tag-Application is identified as TA1 and stored in the Tag-Applications table in an Un-materialized state. The delta (different values for attributes a1, and a2) for this Tag-Application is captured in the Tag_Application_Delta table. Entries are also created in the Tagged_Artifacts table to associate TA1 to Document-v1 and in the Tag_Application_Hierarchy table with TA1 and its parent set to TA0.

Similar entries are made when a third version of the document, Document-v2 is created and tag T is applied to it with another set of attribute values, resulting in Tag-Application TA2.

When a fourth version of the document, Document-v3 is created and T is applied to it but say with the same attribute values as Tag-Application TA2, we store this Tag-Application, TA3 as an Un-materialized Tag-Application that references TA2 in the Tag_Application_Hierarchy table. Entries are made in the Tag_Application_Delta table and the Tagged_Artifacts table to associate TA3 to Document-v3.

At this stage the data in all four tables will be as follows:

| Tag_Applications | |
|---|---|
| Tag_Application_Id | Tag_Application |
| TA0 | [Tag T, a1 = x1, a2 = x2, a3 = x3] |
| TA1 | Null |
| TA2 | Null |
| TA3 | Null |

| Tag_Application_Hierarchy | |
|---|---|
| Tag_Application_Id | Parent_Tag_Application_Id |
| TA0 | Null |
| TA1 | TA0 |
| TA2 | TA1 |
| TA3 | TA2 |

| Tagged_Artifacts | |
|---|---|
| Artifact_Id | Tag_Application_Id |
| Document-v0 | TA0 |
| Document-v1 | TA1 |
| Document-v2 | TA2 |
| Document-v3 | TA3 |

| Tag_Application_Deltas | | |
|---|---|---|
| Tag_App_Delta_Id | Tag_Application_Id | Tag_Application_Delta |
| TD1 | TA1 | [Tag T, a1 = y1, a2 = y2] |
| TD2 | TA2 | [Tag T, a1 = z1] |
| TD3 | TA3 | Null |

Finally, in order to retrieve the Tag-application for any given version of the document, say Document-v2, we do the following:
1. We first walk up the hierarchy collecting the Tag-Application deltas at each level. To illustrate this let us define a nested table of PL/SQL objects that capture the Tag-Application Id and any associated delta as follows:

```
CREATE TYPE TAG_APP_DELTA_T AS OBJECT(
    TAG_APP_ID      number,
    TAG_APP_DELTA   Sys.XMLTYPE);
CREATE TYPE TAG_APP_DELTA_LIST_T AS TABLE OF
TAG_APP_DELTA_T;
    tag_app_deltas TAG_APP_DELTA_LIST_T;
```

The SQL query to walk up the hierarchy capturing these details into object tag_app_deltas is as follows:

```
SELECT
    TAG_APP_DELTA_T(HIER.Tag_Application_Id,
TAD.Tag_Application_Delta)
    BULK COLLECT INTO tag_app_deltas
    FROM
        (SELECT Tag_Application_Id
        FROM TAG_APPLICATION_HIERARCHY
        START WITH Tag_Application_Id = (SELECT
            Tag_Application_Id
            FROM TAGGED_ARTIFACTS WHERE Artifact_Id =
                Document-v2)
        CONNECT BY PRIOR Tag_Application_Id =
            Parent_Tag_Application_Id)
        HIER, TAG_APPLICATION_DELTAS TAD
    WHERE
        HIER.Tag_Application_Id = TAD.Tag_Application_Id(+);
```

2. We then define a PL/SQL function that takes the above data structure and computes the effective Tag-Application. As the order of the elements is guaranteed to be in hierarchical order, the first element is the root and will have a fully materialized Tag-Application. The function then retrieves this Tag-Application and sequentially applies the deltas captured, on it to compute the effective Tag-Application. The pseudo code for this function is as follows:

```
Function resolveTagApplications(
    i_tagAppDeltas   IN TAG_APP_DELTA_LIST_T
) return Sys.XMLTYPE
Is
    I_materializedTagApp Sys.XMLTYPE;
Begin
    --Retrieve the materialized tag application
    SELECT Tag_Application into I_materializedTagApp
    FROM TAG_APPLICATIONS
    WHERE TAG_APPLICATIONS.Tag_Application_Id =
        i_tagAppDeltas(1). TAG_APP_ID;
```

Using I_materializedTagApp, iterate over the data structure computing the effective tag-application

```
For i in 2..i_tagAppDeltas.count Loop
    --Function applyDelta( ) applies the each delta to an existing Tag-
application
    I_materializedTagApp :=
        applyDelta(I_materializedTagApp, i_tagAppDeltas (i).
TAG_APP_DELTA);
    loop;
    rn I_materializedTagApp ;
End resolveTagApplication;
```

The method of FIG. 3A may be used to program a computer system 1000 of the type illustrated in FIG. 5A which is discussed next. Specifically, computer system 200 includes a bus 1102 (FIG. 5A) or other communication mechanism for communicating information, and a processor 1105 coupled with bus 1102 for processing information. Computer system 1000 uses as its memory 21 (FIG. 2) a main memory 1106, such as a random access memory (RAM) or other dynamic storage device, coupled to bus 1102 for storing information and instructions (e.g. for the method of FIG. 2A) to be executed by processor 1105.

Main memory 1106 also may be used for storing temporary variables or other intermediate information (e.g. objects 221-226 and label applications 251-253, 261 and 262 shown in FIG. 2) during execution of instructions to be executed by processor 1105. Computer system 1000 further includes a read only memory (ROM) 1104 or other static storage device coupled to bus 1102 for storing static information and instructions for processor 1105, such as collaboration software 200. A storage device 1110, such as a magnetic disk or optical disk, is provided and coupled to bus 1102 for storing information and instructions.

Computer system 1000 may be coupled via bus 1102 to a display device or video monitor 1112 such as a cathode ray tube (CRT) or a liquid crystal display (LCD), for displaying information to a computer user, e.g. information in objects 221-226 and label applications 251-253, 261 and 262 may be displayed on display 1112. An input device 1114, including alphanumeric and other keys (e.g. of a keyboard), is coupled to bus 1102 for communicating information and changes to objects 216 and 217 to processor 1105. Another type of user input device is cursor control 1116, such as a mouse, a trackball, or cursor direction keys for communicating information and command selections to processor 1105 and for controlling cursor movement on display 1112. This input device typically has two degrees of freedom in two axes, a first axis (e.g., x) and a second axis (e.g., y), that allows the device to specify positions in a plane.

As described elsewhere herein, versioning of objects in a collaboration system 299 is performed by computer system 1000 in response to processor 1105 executing one or more sequences of one or more instructions for a versioning processor that are contained in main memory 1106. Such instructions may be read into main memory 1106 from another computer-readable storage medium, such as storage device 1110. Execution of the sequences of instructions contained in main memory 1106 causes processor 1105 to perform the operations of a process described herein and illustrated in FIG. 3A. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any storage medium that participates in providing instructions to processor 1105 for execution. Such a storage medium may take many forms, including but not limited to (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1110. Volatile storage media includes dynamic memory, such as main memory 1106 which may be implemented in the form of a random access memory or RAM.

Instead of or in addition to a storage medium, transmission link may be used to provide instructions to processor 1105. A transmission link includes coaxial cables, copper wire and fiber optics, including the wires that comprise bus 1102. A transmission link can also take the form of acoustic or light waves, such as those generated during radio-wave and infra-red data communications, any of which can be used to implement a carrier wave as described herein.

Accordingly, instructions to processor 1105 can be provided by a transmission link or by a storage medium from which a computer can read information, such as data and/or code. Specifically, various forms of transmission link and/or storage medium may be involved in providing one or more sequences of one or more instructions to processor 1105 for execution. For example, the instructions may initially be comprised in a storage device, such as a magnetic disk, of a remote computer. The remote computer can load the instructions into its dynamic memory (RAM) and send the instructions over a telephone line using a modem.

A modem local to computer system 1000 can receive information about a change to a collaboration object on the telephone line and use an infra-red transmitter to transmit the information in an infra-red signal. An infra-red detector can receive the information carried in the infra-red signal and appropriate circuitry can place the information on bus 1102. Bus 1102 carries the information to main memory 1106, from which processor 1105 retrieves and executes the instructions. The instructions received by main memory 1106 may optionally be stored on storage device 1110 either before or after execution by processor 1105.

Computer system 1000 also includes a communication interface 1115 coupled to bus 1102. Communication interface 1115 provides a two-way data communication coupling to a network link 1120 that is connected to a local network 1122. Local network 1122 may interconnect multiple computers (as described above). For example, communication interface 1115 may be an integrated services digital network (ISDN) card or a modem to provide a data communication connection to a corresponding type of telephone line. As another example, communication interface 1115 may be a local area network (LAN) card to provide a data communication connection to a compatible LAN. Wireless links may also be implemented. In any such implementation, communication interface 1115 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1125 or to data equipment operated by an Internet Service Provider (ISP) 1126. ISP 1126 in turn provides data communication services through the world wide packet data communication network 1124 now commonly referred to as the "Internet". Local network 1122 and network 1124 both use electrical, electromagnetic or optical signals that carry digital data streams. The signals through the various networks and the signals on network link 1120 and through communication interface 1115, which carry the digital data to and from computer system 1000, are exemplary forms of carrier waves transporting the information.

Computer system 1000 can send messages and receive data, including program code, through the network(s), network link 1120 and communication interface 1115. In the Internet example, a server 1100 might transmit information related to objects 216 and 217 retrieved from a distributed database system through Internet 1124, ISP 1126, local network 1122 and communication interface 1115. The instructions for performing the operations of FIG. 3A may be executed by processor 1105 as they are received, and/or stored in storage device 1110, or other non-volatile storage for later execution. In this manner, computer system 200 may obtain the just-described instructions and any related data in the form of a carrier wave.

Figure 5A:
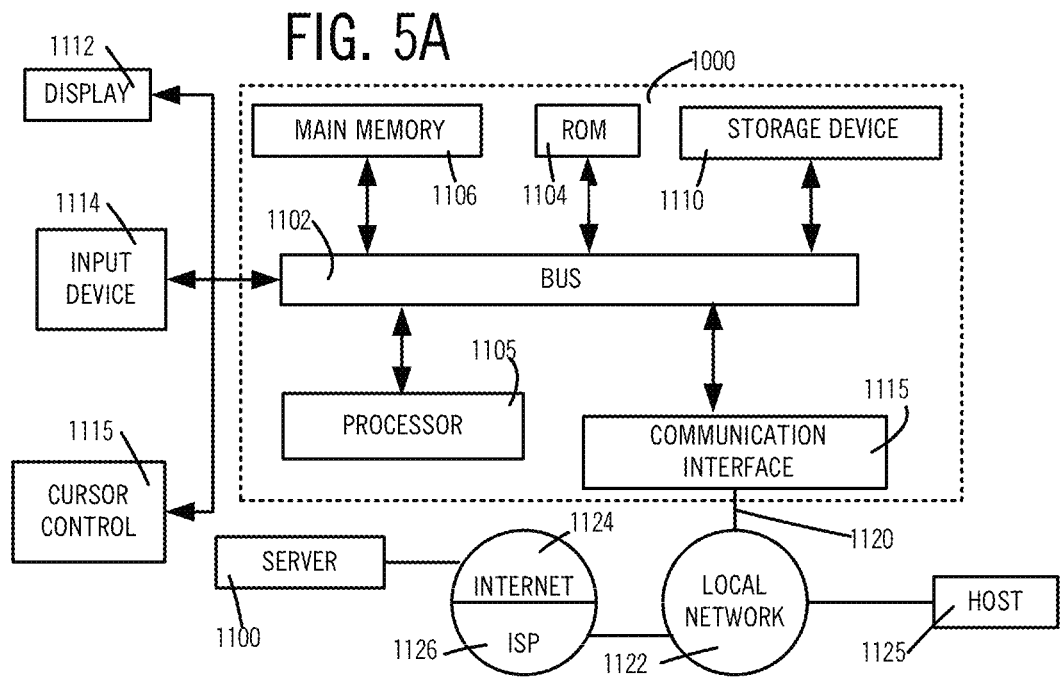
FIGS. 5A and 5B illustrate, in block diagrams, hardware and software portions of a computer that performs the method illustrated in FIG. 3A.
Figure 5B:
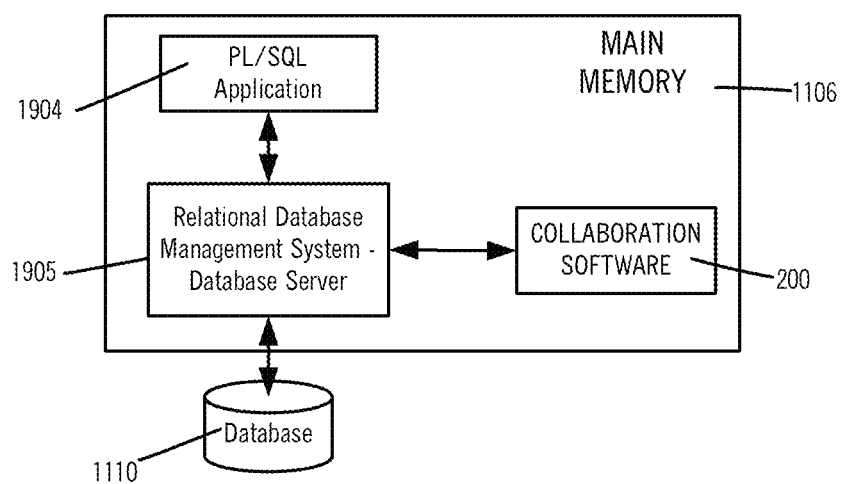

Note that FIG. 5A is a very low-level representation of many hardware components of a computer system. Several embodiments have one or more additional software components in main memory 1106 as shown in FIG. 5B. Specifically, in such embodiments, computer system 200 of FIG. 5A implements a relational database management system 1905 of the type illustrated in FIG. 5B. Relational database management system 1905 may manage a distributed database system that includes multiple databases, each database being stored on different storage mechanisms.

In some embodiments, the multiple databases are made to appear to an application 1904 as a single database. In such embodiments, an application 1904 can access and modify the data in a database via a network that interconnects them. In other embodiments, an application 1904 interacts with only one database, e.g. database 1110. Database 1110 is controlled by a database management server (DBMS) 1905 which maintains overall consistency of data stored by database 1110. In several embodiments, the DBMS is responsive to commands (also called queries) from application 1904 and/or collaboration software 200 in conformance with a relational database language, the most common of which is the Structured Query Language (SQL). The commands are used by application 1904 of some embodiments to store, modify and retrieve data about objects 221-226 and label applications 251-253, 261 and 262 in the form of rows in tables in database 1110. The tables have one or more columns and zero or more rows as in a relational database that stores data in the form of tables related to one another.

Relational database management system 1905 further includes an output logic that makes information related to objects 221-226 and label applications 251-253, 261 and 262 available to a user via a graphical user interface that generates a display on a video monitor 1112. In one example, the output logic provides analysis results via a web-based user interface that depicts information related to a part of a collaboration object and marks thereon any changes to the collaboration object. Additionally and/or alternatively, a database-centric screen is responsive to a command in a command-line interface and displays on a video monitor text information on incoming and/or outgoing flows of information about a collaboration object.

Numerous modifications and adaptations of the embodiments described herein will become apparent to the skilled artisan in view of this disclosure.

Numerous modifications and adaptations of the embodiments described herein are encompassed by the scope of the invention.

What is claimed is:

1. A non-transitory computer-readable storage medium comprising a plurality of instructions to be executed in a computer for versioning of tags, the plurality of instructions comprising:
   instructions to receive information identifying a new first value of a first attribute of a tag applied to an object comprised among a plurality of objects in a memory of the computer, the information identifying no change to existing values of other attributes of the tag;
   wherein the object is of any type selected from at least a message type, a document type, a contact type, a discussion type, or a meeting type;
   wherein the other attributes are different from the first attribute;
   instructions responsive to receipt of the information, to automatically create for the object an incremental tag application comprising the new first value for the first attribute of the tag applied to the object and lacking the existing values of the other attributes of the tag applied to the object;
   instructions to automatically store in the memory, the incremental tag application in association with existing metadata comprising a full tag application to the object, the full tag application comprising an existing second value of a second attribute and an existing first value of the first attribute;
   instructions to receive a command to retrieve a current tag application for the object;
   instructions responsive to receipt of the command, to automatically prepare the current tag application by at least: retrieving the incremental tag application, retrieving the full tag application, and constructing the current tag application to comprise the new first value for the first attribute retrieved from the incremental tag application and the existing values of the other attributes retrieved from the full tag application; and
   instructions to automatically store in said memory, said current tag application.

2. The computer-readable storage medium of claim 1 wherein:
   the existing metadata comprises another tag application, said another tag application comprising a keyword selected from among a plurality of predetermined keywords; and
   each of the new first value and the existing first value are selected from among a plurality of predetermined first values specific to the keyword.

3. The computer-readable storage medium of claim 1 wherein:
   the incremental tag application is created without any change to the content; and
   the tag application is versioned without duplicating the content.

4. The computer-readable storage medium of claim 1 wherein the incremental tag application is hereinafter first incremental tag application and wherein:
   the instructions are responsive to receipt of a new second value, of the second attribute of the tag comprised in the other attributes, to automatically create and store in memory for the object a second incremental tag application comprising the new second value; and
   the instructions automatically prepare the current tag application by using the new second value retrieved from the second incremental tag application.

5. An apparatus for versioning tags, the apparatus comprising a computer, the computer comprising a processor and a memory coupled to the processor, the computer further comprising:
   means for receiving information identifying a new first value of a first attribute of a tag applied to an object comprised among a plurality of objects in the memory of the computer, the information identifying no change to existing values of other attributes of the tag;
   wherein the object is of any type selected from at least a message type, a document type, a contact type, a discussion type, or a meeting type;
   wherein the other attributes are different from the first attribute;
   means for creating, in the memory of the computer, for the object an incremental tag application comprising the new first value for the first attribute of the tag applied to the object and lacking the existing values of the other attributes of the tag applied to the object;
   means for storing in the memory of the computer, the incremental tag application in association with existing metadata comprising a full tag application to the object, the full tag application comprising an existing second value of a second attribute and an existing first value of the first attribute;
   means for receiving a command to retrieve a current tag application for the object;
   means for preparing the current tag application by at least: retrieving the incremental tag application, retrieving the full tag application, and constructing the current tag application to comprise the new first value for the first attribute retrieved from the incremental tag application and the existing values of the other attributes retrieved from the full tag application; and means for storing in said memory of said computer, said current tag application.

6. A computer-implemented method for versioning tags, the method comprising:

receiving information identifying a new first value of a first attribute of a tag applied to an object comprised among a plurality of objects in a memory of a computer, the information identifying no change to existing values of other attributes of the tag;

wherein the object is of any type selected from at least a message type, a document type, a contact type, a discussion type, or a meeting type;

wherein the other attributes are different from the first attribute;

creating, in the memory of the computer, for the object an incremental tag application comprising the new first value for the first attribute of the tag applied to the object and lacking the existing values of the other attributes of the tag applied to the object;

storing in the memory of the computer, the incremental tag application in association with existing metadata comprising a full tag application to the object, the full tag application comprising an existing second value of a second attribute and an existing first value of the first attribute;

receiving a command to retrieve a current tag application for the object;

preparing the current tag application by at least: retrieving the incremental tag application, retrieving the full tag application, and constructing the current tag application to comprise the new first value for the first attribute retrieved from the incremental tag application and the existing values of the additional attributes retrieved from the full tag application; and storing in said memory of said computer, said current tag application.

7. The method of claim 6 wherein:

the existing metadata comprises another tag application, said another tag application comprising a keyword selected from among a plurality of predetermined keywords; and each of the new first value and the existing first value are selected from among a plurality of predetermined first values specific to the keyword.

8. The method of claim 6 wherein:

the incremental tag application is created without any change to the content; and the tag application is versioned without duplicating the content.

9. The method of claim 6 wherein the incremental tag application is hereinafter first incremental tag application and wherein the method further comprises:

responding to receipt of a new second value, of the second attribute of the tag comprised in the other attributes, by creating and storing in said memory for the object a second incremental tag application comprising the new second value; and preparing the current tag application by using the new second value retrieved from the second incremental tag application.

10. The apparatus of claim 5 wherein:

the existing metadata comprises another tag application, said another tag application comprising a keyword selected from among a plurality of predetermined keywords; and each of the new first value and the existing first value are selected from among a plurality of predetermined first values specific to the keyword.

11. The apparatus of claim 5 wherein:

the incremental tag application is created without any change to the content; and the tag application is versioned without duplicating the content.

12. The apparatus of claim 5 wherein said incremental tag application is hereinafter first incremental tag application and wherein the apparatus further comprises:

means for responding to receipt of a new second value, of the second attribute of the tag comprised in the other attributes, by creating and storing in said memory for the object a second incremental tag application comprising the new second value; and means for preparing the current tag application by using the new second value retrieved from the second incremental tag application.

13. The computer-readable storage medium of claim 1 wherein:

the instructions to automatically prepare the current tag application apply a plurality of incremental tag applications including the incremental tag application; and the plurality of incremental tag applications are applied based on a sequence of creation of the plurality of incremental tag applications.

14. The computer-readable storage medium of claim 13 wherein:

the instructions to automatically prepare the current tag application check if all incremental tag applications in the plurality of incremental tag applications have been used; and the instructions to automatically prepare return a result when all incremental tag applications have been used.

15. The method of claim 6 wherein:

the preparing of the current tag application comprises applying a plurality of incremental tag applications including the incremental tag application; and the plurality of incremental tag applications are applied based on a sequence of creation of the plurality of incremental tag applications.

16. The method of claim 15 wherein:

the preparing of the current tag application comprises checking if all incremental tag applications in the plurality of incremental tag applications have been used; and the preparing of the current tag application further comprises returning a result when all incremental tag applications have been used.

17. The apparatus of claim 5 wherein:

the means for preparing the current tag application comprise means for applying a plurality of incremental tag applications including the incremental tag application; and the plurality of incremental tag applications are applied based on a sequence of creation of the plurality of incremental tag applications.

18. The apparatus of claim 17 wherein:

the means for preparing the current tag application comprise means for checking if all incremental tag applications in the plurality of incremental tag applications have been used; and the means for preparing the current tag application comprise means for returning a result when all incremental tag applications have been used.

19. The computer-readable storage medium of claim 1 further comprising:
- instructions to create a new version of the object without replicating the full tag application and the incremental tag application; and
- instructions to associate the full tag application and the incremental tag application with the new version of the object.

20. The method of claim 6 further comprising:
- creating a new version of the object without replicating the full tag application and the incremental tag application; and
- associating the full tag application and the incremental tag application with the new version of the object.

* * * * *